United States Patent
Meyer et al.

(10) Patent No.: US 10,788,402 B2
(45) Date of Patent: Sep. 29, 2020

(54) FIELD MAINTENANCE TOOL FOR DEVICE COMMISSIONING

(71) Applicant: Fisher-Rosemount Systems, Inc., Round Rock, TX (US)

(72) Inventors: Nicholas T. Meyer, Crystal, MN (US); Alden C. Russell, III, Eden Prairie, MN (US)

(73) Assignee: Fisher-Rosemount Systems, Inc., Round Rock, TX (US)

(*) Notice: Subject to any disclaimer, the term of this patent is extended or adjusted under 35 U.S.C. 154(b) by 226 days.

(21) Appl. No.: 15/333,724

(22) Filed: Oct. 25, 2016

(65) Prior Publication Data
US 2018/0113056 A1     Apr. 26, 2018

(51) Int. Cl.
*G01M 99/00*     (2011.01)
*G05B 19/042*    (2006.01)
*G08B 21/18*     (2006.01)

(52) U.S. Cl.
CPC ....... *G01M 99/008* (2013.01); *G05B 19/0428* (2013.01); *G08B 21/18* (2013.01); *G05B 2219/25428* (2013.01)

(58) Field of Classification Search
CPC ...... G01M 99/008; G08B 21/18; G05B 23/00
See application file for complete search history.

(56) References Cited

U.S. PATENT DOCUMENTS

| 2005/0164684 | A1 | 7/2005 | Chen et al. |
| 2006/0161393 | A1 | 7/2006 | Zielinski et al. |
| 2007/0280287 | A1* | 12/2007 | Samudrala ............... H04L 69/08 370/466 |
| 2009/0016462 | A1* | 1/2009 | Da Silva Neto ... G05B 19/0421 375/295 |
| 2010/0145476 | A1* | 6/2010 | Junk .................... G05B 19/042 700/7 |

(Continued)

FOREIGN PATENT DOCUMENTS

| DE | 10245176 | 4/2004 |
| DE | 102008029406 | 12/2009 |

(Continued)

OTHER PUBLICATIONS

Office Action for Chinese Patent Application No. 201180001611.2, dated May 31, 2016, 15 pages.

(Continued)

*Primary Examiner* — Lisa E Peters
(74) *Attorney, Agent, or Firm* — Christopher R. Christenson; Kelly, Holt & Christenson PLLC

(57) ABSTRACT

A method of testing a configuration of a field device is provided. The method includes moving a handheld field maintenance tool into proximity of the field device and generating a simulated process control signal configured to cause the field device to change state. The method also includes performing a digital check, with a remote system, to confirm that the field device is communicably coupled to a process control loop and obtaining a result, from an operator of the handheld field maintenance tool. The result is received by the handheld field maintenance tool through the user interface and includes an indication of a response of the field device to the simulated process control signal.

18 Claims, 5 Drawing Sheets

(56) References Cited

U.S. PATENT DOCUMENTS

| | | | |
|---|---|---|---|
| 2010/0149997 A1* | 6/2010 | Law | G05B 19/4185 370/248 |
| 2010/0290359 A1* | 11/2010 | Dewey | G05B 19/4185 370/252 |
| 2015/0046125 A1 | 2/2015 | Jagiella et al. | |
| 2017/0052524 A1* | 2/2017 | Kunz | G05B 19/0426 |

FOREIGN PATENT DOCUMENTS

| | | |
|---|---|---|
| DE | 102009028195 | 2/2011 |
| EP | 1515208 | 3/2005 |
| EP | 1916582 | 4/2008 |
| EP | 2077473 | 7/2009 |
| GB | 2382418 | 5/2003 |
| GB | 2 394 124 | 4/2004 |
| JP | 200791381 | 4/2007 |
| JP | 2013535740 A | 9/2013 |
| JP | 2013200670 A | 10/2013 |
| JP | 2014526095 A | 10/2014 |
| JP | 2015-0230538 A | 12/2015 |
| JP | 2016201793 A | 12/2016 |
| WO | WO 2001/35190 | 5/2001 |
| WO | WO 2002/086662 | 10/2002 |
| WO | WO20081042074 | 4/2008 |
| WO | WO2008127632 | 10/2008 |
| WO | WO 2009/003146 | 12/2008 |
| WO | WO 2009/003148 | 12/2008 |
| WO | WO 2009074544 | 6/2009 |

OTHER PUBLICATIONS

Office Action for Canadian Patent Application No. 2,806,564, dated Jan. 11, 2016, 4 pages.
Office Action for Canadian Patent Application No. 2,806,722, dated Oct. 13, 2015, 5 pages.
Fourth Office Action for Chinese Patent Application No. 201180001611.2, dated Nov. 25, 2015, 14 pages, with English translation.
Third Office Action for Chinese Patent Application No. 201180001611.2, dated May 27, 2015, 14 pages, with English translation.
Authors Unknown, Foundation Fieldbus Blocks, Fisher-Rosemount, 00908-0100-4783, Rev. Ba, 2000, 102 pages.
Office Action for Chinese Patent Application No. 201180001617.X, dated Feb. 4, 2015, 15 pages, with English translation.
Office Action for Russian Patent Application No. 2013108780. dated Oct. 24. 2014, 10 pages, with English translation.
Notification on results of examination of invention patentability for Russian Patent Application No. 2013108819, dated Nov. 13, 2014, 7 pages, with English translation.
Second Office Action from Chinese Patent Application No. 201180001611.2, dated Nov. 18, 2015, 9 pages with English translation.
Office Action for Canadian Patent Application No. 2,806,722, dated Jul. 28, 2014, 3 pages.
Office action for Canadian Patent Application No. 2,806,564, dated Jul. 31, 2014, 5 pages.
Office Action for counterpart Japanese Patent Application No. 2013-521968, dated Jan. 21, 2014, 7 pages, with English translation.
Office Action for Chinese Patent Application No. 20118001611.2, dated Apr. 3, 2014, 14 pages, with English translation.
Office Action for Japanese Patent Application No. 2013-521966, dated Dec. 24, 2013, 7 pages, with English Translation.
Notification of Transmittal of the International Search Report and Written Opinion for the International application No. PCT/US2011/045680 dated Jul. 6, 2012, 16 pages.
Notification of Transmittal of the International Search Report and Written Opinion for the International application No. PCT/US2011/045681, dated Jan. 5, 2012, 12 pages.
475 Field Communicator, User's Guide XP007919976, Aug. 2009, www.fieldcommunicator.com by Emerson Process Management, 114 pages.
Search and Examination Report for United Kingdom Patent Application No. 1709412.9, dated Oct. 17, 2017, 8 pages.
1420 Wireless Gateway Reference Manual 00809-0100-4420, Rev BA. Aug. 2007, Emerson Management, 34 pages.
Invitation to pay additional fees from International patent application No. PCT/US2011/045679. dated Aug. 6, 2012, 8 pages.
Invitation to pay additional fees from International patent application No. PCT/US2011/045664, dated Aug. 9, 2012, 7 pages.
Invitation to pay additional fees from International patent application No. PCT/US2011/045676, dated Jul. 30, 2012, 10 pages.
Lee S W et al: "Honam Petrochemical Corporation Uses Simulator for Ethylene PLant Operator Training", Processing of Industrial Computing Conference Houston, Oct. 18-23, 1992, pp. 219-222, 5 pages.
Kurrle H-P et al.: "Trainings simulator Zur Ausbidung Von Chemikanten and Anlagenfahrem Otraining Simulator for the Training of Process Workers (Chemikanten) and Operators", Automatisierungstechnische Praxis—ATP, Oldenbourg Indusrieverlag, Munchen, DE, vol. 36, No. 7, Jul. 1, 1994, Abstravt, Section 2, 6 pages.
Invitation to pay additional fees from International patent application No. PCT/US2011/045665, dated Aug. 23, 2012, 10 pages.
Bushman J B: " Ally: an Operator's Associate for Cooperative Supervisory Control Systems", IEEE Transactions on Systems, Man and Cybernetics, IEEE Inc. New York, US, vol. 23, no. 1, Jan. 1, 1993, p. numbers 111-128, 18 pp.
First Communication for European Patent Application No. 107302812, dated Oct. 11, 2012, 5 pages.
International Search Report and Written Opinion from the related International Patent Application No. PCT/US2011/045664, dated dated Nov. 6, 2012, 22 pages.
International Search Report and Written Opinion from the related International Patent Application No. PCT/US2011/045679, dated Nov. 6, 2012, 27 pages.
International Search Report and Written Opinion from the related International Patent Application No. PCT/US2011/045665 dated Nov. 6, 2012, 24 pages.
First Communication for European Patent Application No. 107255432, dated Oct. 11, 2012, 7 pages.
First Communication for European Patent Application No. 107302796, dated Oct. 19, 2012, 7 pages.
Office Action from Russian Application No. 2011151063, dated Nov. 12, 2012, 5 pages with English Translation.
Office Action from Japanese Application No. 2015511048, dated Jan. 29, 2013, 7 pages with English Translation.
Invitation to pay additional fees from International patent application No. PCT/US2010/034889, dated Sep. 15, 2010, 5 pages.
ABB Limited: "Wireless Instrumentation Jargon Buster", Information bulletin instrumentation ABB No. IB/INST_018, Mar. 3, 2009, XP002596601, Retrieved from the Internet: URL:http://www05.abb.com/global/scot/scot203.nsf/veritydisplay/be00ec76ef07e978c125756e003157b9/$File/IB_INST_018_1.pdf, 28 pages.
First Office Action dated Sep. 4, 2018 for Japanese Patent Application. No. 2017-100682, 11 pages including English translation.
Second Office Action for Japanese Patent Application No. 2017-100682 dated Sep. 3, 2019, 5 pages with English translation.
Notifcation of Transmittal of the International Search REport and the Written Opinion from the International Application No. PCT/US2010/021764, dated Dec. 5, 2010, 11 pages.
David Gustafsson: "WirelessHART—Implementation and Evaluation on Wireless Sensors". Masters's Degree Project, KTH University, Electrical Engineering, Apr. 1, 2009, pp. 1-39, XP002596602, Stockholm, Sweden. Retrieved from the Internet: URL:http://www.ee.kth.se/php/modules/publications/reports/2009/XR-EE-RT%202009:003.pdf, 44 pages.
Notification of Transmittal of the International Search Report and Written Opinion for the International application No. PCT/US2010/034848, dated Aug. 26, 2010, 16 pages.
Possio Bluetooth to WLAN Gateway PX20: Full Product Description retrieved from http://www.blueunplugged.com/p.aspx?p=10516, 3 pages.
1420 Wireless Gateway: Product Data Sheet 00813-0100-4420, Rev BA Mar. 2008. Emerson Process Managment, 12 pages.

(56) References Cited

OTHER PUBLICATIONS

Smart Wireless Gateway (WirelessHART™), Quick Installation Guide 00825-0200-4200, Rev BA, Aug. 2009, Emerson Process Managment, 20 pages.
Rosemount 3051S Wireless Series Scalable Pressure Flow and Level Solutions, Reference Manual 00809-0100-4802, rev BA, Aug. 2007, Emerson Process Management, 92 pages.
EPO Communication pursuant to Ruled 161(1) and 162 EPC for European patent application No. 10701430.0, dated Aug. 30, 2011, 2 pages.
Invitation to Pay Additional Fees for internatinal patent applicatin No. PCT/US2010/034949, dated Sep. 17, 2010, 6 pages.
Technical Data Sheet: VIATOR® USB HART® Interface (Model 010031), MACTek Measurement and Control Technologies, 1 page, Jan. 24, 2004.
VIATOR® Bluetooth® Wireless Technology Interface for use with HART field devices, MACTek Measurement and COntrol Technologies retrieved from www.mactekcorp.com/product5.htrn, 3 pages, Mar. 13, 2009.
Product Data Sheet: Viator RS232, MACTek Measurement and Control Technologies retrieved from www.mactekcorp.com/product1.htm, 2 pages, Mar. 13, 2009.
Notification of Transmittal of the International Search Report and Written Opinion for the International application No. PCT/US2010/034889, dated Nov. 17, 2010, 21 pages.
Notification of Transmittal of the International Search Report and Written Opinion for the International application No. PCT/US2010/034949, dated Nov. 17, 2010, 16 pages.
EPO Communication from European application No. 10730279.6, dated Jan. 13, 2012, 2 pages.
EPO Communication from European application No. 10730281.2, dated Jan. 13, 2012, 2 pages.
EPO Communication from European application No. 110725543.2, dated Jan. 12, 2012, 2 pages.
Rosemount Inc. 3051SMV QUick INstallation Guide 00825-0100-4803 Rev BA, Apr. 2001, 46 pages.
First Office Action for Chinese Patent Application No. 201710575308.2 dated Nov. 27, 2019, 21 pages including English translation.
Examination Report for Great Britain Patent Application No. 1709412.9, dated Mar. 30, 2020, 2 pages.

* cited by examiner

FIELD MAINTENANCE TOOL FOR DEVICE COMMISSIONING

BACKGROUND

In industrial settings, control systems are used to monitor and control industrial and chemical processes. Typically, the process control system performs these functions using field devices distributed at key locations in the industrial process and coupled to the control circuitry in the control room by a process control loop. A single industrial process may comprise tens, hundreds, or even thousands of field devices that communicate with one another, as well as with a central or remote control system over a wired or wireless network. Field devices generally perform a function, such as sensing a parameter or controlling a valve within the process, in a distributed control or process monitoring system.

SUMMARY

A method of testing a configuration of a field device is provided. The method includes moving a handheld field maintenance tool into proximity of the field device and generating a simulated process control signal configured to cause the field device to change state. The method also includes performing a digital check, with a remote system, to confirm that the field device is communicably coupled to a process control loop and obtaining a result, from an operator of the handheld field maintenance tool. The result is received by the handheld field maintenance tool through the user interface and includes an indication of a response of the field device to the simulated process control signal.

DETAILED DESCRIPTION OF ILLUSTRATIVE EMBODIMENTS

Figure 1:
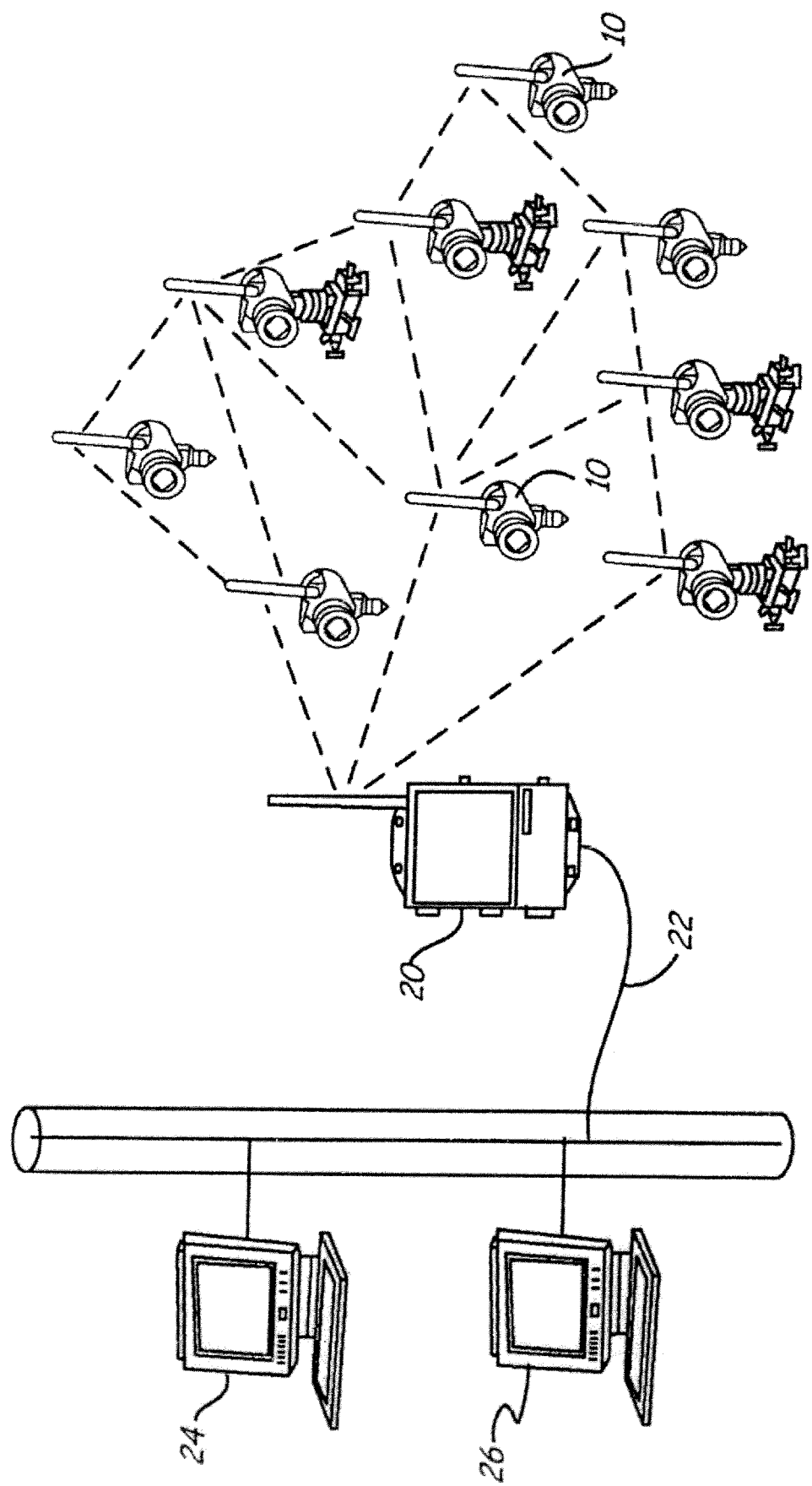
FIG. 1 is a diagrammatic view of a wireless process control environment in which embodiments of the present invention are particularly useful.

Some process installations may involve highly volatile, or even explosive, environments. Accordingly, it is often beneficial, or even required, for field devices and the handheld field maintenance tools used with such field devices to comply with intrinsic safety requirements. These requirements help ensure that compliant electrical devices will not generate a source of ignition even under fault conditions. One example of intrinsic safety requirements is set forth in: APPROVAL STANDARD INTRINSICALLY SAFE APPARATUS AND ASSOCIATED APPARATUS FOR USE IN CLASS I, II and III, DIVISION NUMBER 1 HAZARDOUS (CLASSIFIED) LOCATIONS, CLASS 3610, promulgated by Factory Mutual Research October, 1998. Examples of handheld field maintenance tools that comply with intrinsic safety requirements include those sold under trade designation Model 475 field communicator, which is available from Emerson Process Management of Austin, Tex.

Typically, each field device includes communication circuitry used to communicate with the process control room, or other circuitry, over a process control loop. Traditionally, analog field devices connect to the control room using a two wire process control loop, with each device connected to the control room by a single two wire control loop. Additionally, digital techniques are used as well. For example, a digital process control loop may be configured for communication using a 4-20 mA current signal with digital signals superimposed on the 4-20 mA analog current. The Highway Addressable Remote Transducer (HART®) protocol is an example of such a technique.

In some installations, wireless technologies are used to communicate with field devices. Wireless operation may simplify field device wiring and setup. One wireless process communication technology standard is known as the WirelessHART standard, published by the HART Communication Foundation in September 2007. Another wireless network communication technology is set forth in ISA 100.11 A, maintained by the International Society of Automation (ISA) which proposed wireless communication at the 2.4 GHz frequency using radio circuitry in accordance with IEEE 802.15.4-2006. Another wireless network communication protocol comprises the FOUNDATION™ Fieldbus protocol.

Process communication and control systems are responsible for measuring and controlling process parameters that control such critical processes as oil refining, pharmaceutical manufacturing, food preparation, etc. Exacting control of such processes is vitally important to ensure that the product is processed according to strict specifications, and without risking damage or injury to the processor. In wire conducted process control installations, such as the (HART®) Protocol or the FOUNDATION™ Fieldbus Protocol, the devices are all configured based upon physical connections to the process communication loop.

While the utilization of wireless communication for field devices has vastly simplified wiring and maintenance, it is important that only authorized devices are allowed to communicate on such wireless process control loops. Further, since multiple such process control loops may exist in proximity to one another, it is also important that a wireless field device be specifically configured for the wireless process communication loop to which it is intended. Once the field device has joined the process control loop, a variety of features relative to the device are available to users and/or technicians through a wired or wireless process control loop.

Process control loops may require communication from multiple field devices in order to trigger a response. As a simple example, in order to trigger a release valve opening, an indication of an overflow condition may need to be received from multiple sensors. However more complex interactions may require communication between multiple field devices on a process control loop. Therefore, in addition to installing a field device, and ensuring it can communicate properly over a network, it may also be necessary to ensure that the field device is working correctly within a process communication loop.

Verifying that a field device is operational within a process control loop may be improved by both digital communication with the field device, and physical confirmation that the device operates as expected—the valve opening after receiving the overflow condition signal, for example. Therefore, it may be necessary for an operator or technician to be near the field device such that they can visually inspect that the field device is operating correctly. However, causing a sufficient operating condition, for example an overflow, may be impractical. Therefore, it may be helpful for an operator to have the functionality, on a handheld field maintenance tool, to cause a simulated signal indicative of a process condition, such as an overflow condition, so that the operator can visually inspect and confirm that the field device operates as expected, while also confirming, digitally, that the device is properly installed on the network. At least some embodiments described herein enable such functionality.

FIG. 1 is a diagrammatic view of a wireless process control environment in which embodiments of the present invention are particularly useful. As illustrated in FIG. 1, a plurality of wireless field devices 10 are communicatively coupled, either directly or indirectly, via wireless communication modules (not shown) to wireless gateway 20. A wireless gateway typically includes a gateway component, a security management component, and a network manager component. While all components are typically present in a single gateway device, these components could be separate devices. Wireless field devices 10 are generally illustrated as wireless process variable transmitters, such as those sold under the trade designation Model 3051 S Wireless Process Transmitter, from Emerson Process Management, of Chanhassen, Minn. However, those skilled in the art will recognize that wireless field devices 10 can include other types of wireless process variable transmitters, as well as wireless actuators, valve positioners, etc. Additionally, those skilled in the art will appreciate that at least some methods and systems herein can apply to wired field devices as well. Wireless gateway 20 is configured to communicate with wireless field devices 10 using known wireless process communication protocols, such as the wireless HART protocol described above. Wireless gateway 20 includes one or more wired ports that are configured to couple to a local area network, such as an Ethernet local area network as illustrated at reference numeral 22. By virtue of its wired connection, wireless gateway 20 can provide information to, and receive information from, any device coupled to local network 22 such as workstation 24 and 26, which may correspond to any of a remote asset management system, a distributed control system, a remote control workstation, etc.

In order for a wireless field device to communicate on a wireless process control loop, it is necessary for the wireless field device to be configured for access to the wireless process communication network. When it becomes necessary to commission a new field device, the processes may be somewhat cumbersome. Additionally, it is helpful to have the device commissioning process occur by a single operator, in view of the field device, such that they can visually confirm that the device is commissioned and working properly. Therefore, it may be advantageous to perform device commissioning while physically located at or near the field device. This enables a technician to not only read the output of a device, but to see and hear other evidence of successful operation. For example, a technician may be able to see a valve opening or closing, hear a pump start up, as well as view an output on a local meter or display.

The commissioning process may also require a technician to verify that the signals received at the other end of the loop (for example, by a distributed control station located remotely from the field device) are as expected. Traditionally, this has required a second operator located in a control room, in radio communication with a technician in the field, which doubles the human resources required to complete a commissioning process for a single field device. The ability to wirelessly connect a handheld field maintenance tool to an asset management system (AMS), and/or a Distributed Control System (DCS), would allow for visual and digital verification of the performance of the device, as well as the control loop, or segment of a control loop, from the vicinity of the device. Both physical and digital verification may, therefore, be accomplished by a single operator, reducing the human resources required under traditional commissioning processes.

Figure 2:
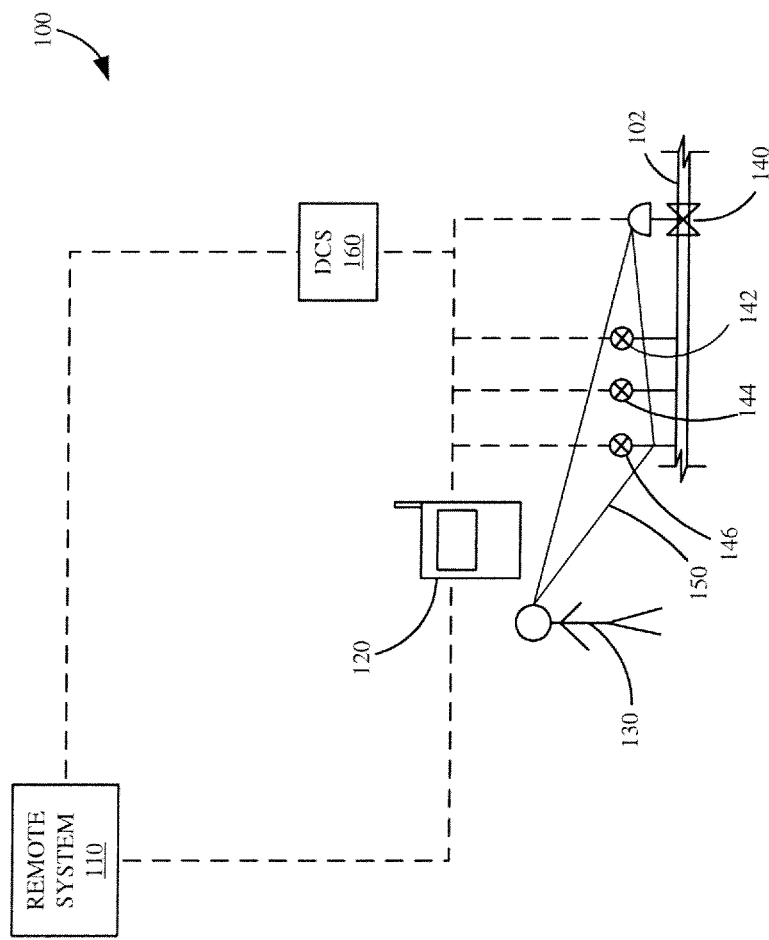
FIG. 2 is a block diagram of an example process control system in accordance with an embodiment of the present invention.

FIG. 2 is a block diagram of an example process control architecture in accordance with one embodiment of the present invention. Process environment 100 illustratively includes a remote system 110 in communication with a handheld field maintenance tool 120, and a distributed control system 160. The remote system 110 may be, for example a distributed control system, an asset management system, or another remote system in wireless communication with the handheld field maintenance tool 120.

Handheld field maintenance tool 120 is illustratively operated by an operator 130. Operator 130 may use handheld field maintenance tool 120 within a visual range 150 of one or more field devices 140. While a process environment 100 may include hundreds or thousands of field devices 140, only one is shown for the purposes of illustration, and not by limitation. Shown in FIG. 2, field device 140 comprises a valve, however one skilled in the art would understand that methods and systems described herein are applicable to any number of field devices that, when actuated, generate a visually or audibly confirmable signal or effect.

Field device 140 may be located within a process installation 102. Process installation 102 may also include one or more transmitters 142, 144, 146. In one embodiment, field device 140 will not actuate without a sensor signal from one or more of transmitters 142, 144, 146. As shown in FIG. 2, operator 130 may be able to, within a visual range 150 of field device 140, simulate an operating condition in order to visually confirm that field device 140 is commissioned correctly and is currently operational. However, it may be dangerous to cause a condition in process 102 sufficient to cause valve 140 to open, or close. Therefore, operator 130 may, using an interface on handheld field maintenance tool 120, to cause one or more transmitters 142, 144, 146 to simulate a signal and cause field device 140 to actuate, producing a visual or audible response, confirmable by an operator in proximity. In one embodiment, handheld field maintenance tool 120 is configured to communicatively couple to remote system 110 which can, through distributed control system 160, simulate a desired signal from one or more transmitters 142, 144, 146. Upon simulation, operator 130 can then confirm whether or not field device 140 responds properly. In the example illustrated in FIG. 2, upon simulating an appropriate signal from transmitter 142, operator may expect to see valve 140 open or close. If operator 130 does not see the expected response, a problem may exist with the configuration of the process control loop. For example, field device 140 may not be commissioned properly. Alternatively, field device 140 may be properly commissioned, but another error may be present within the process control loop, or with the commissioning of another field device within the process installation.

Figure 3:
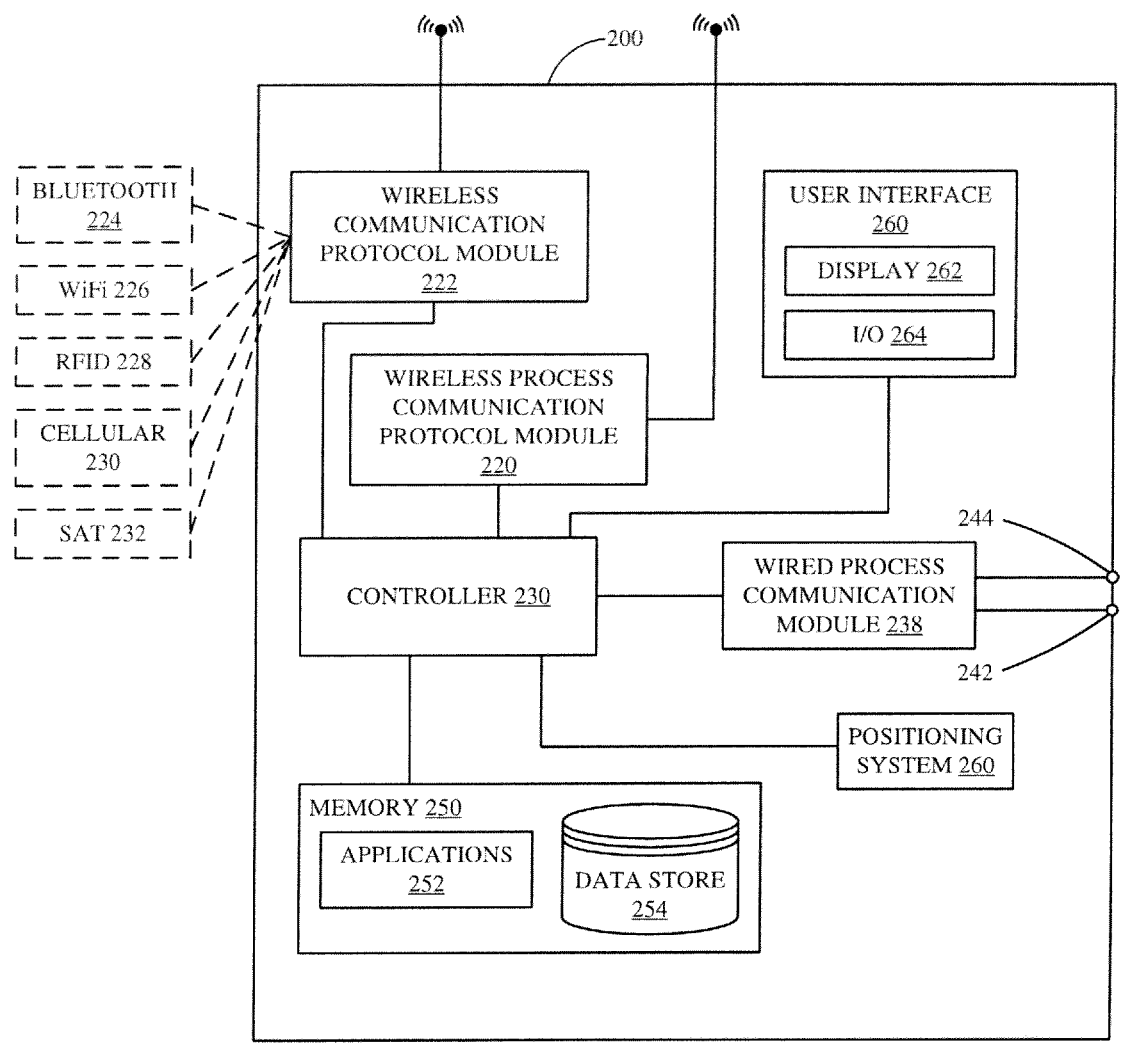
FIG. 3 is a block diagram of a handheld field maintenance tool in accordance with an embodiment of the present invention.

FIG. 3 is a block diagram of a handheld field maintenance tool in accordance with one embodiment of the present invention. Tool 200 may, in one embodiment, be self-powered using a rechargeable battery. In one embodiment, tool 200 is manufactured such that it complies with at least one intrinsic safety specification, such as those listed above, such that it can be safely used in potentially hazardous or explosive environments.

Handheld field maintenance tool 200 includes at least one wireless process communication module 220. Suitable examples for wireless process communication module 220 include any module that generates and/or receives proper signals in accordance with a known process communication protocol, such as the WirelessHART protocol or that set forth in ISA 100.11A described above, or another suitable communication protocol. While FIG. 3 shows a single wireless process communication module 220, it is expressly contemplated that any suitable number of wireless process communication modules can be used to communicate in accordance with various wireless process communication protocols now in existence or later developed.

Handheld field maintenance tool 200 may also include at least one secondary wireless communication protocol module 222. Wireless communication protocol module 22 can communicate in accordance with one or more of the options shown in phantom in FIG. 3. Specifically, wireless communication protocol module 222 may communicate in accordance with a Bluetooth® specification 224, a WiFi specification 226, a Radio-Frequency Identification (RFID) specification 228, cellular communication techniques 230, satellite communication 232, or any other suitable wireless data communication technology, such as LTE. While one wireless communication protocol module 222 is shown in FIG. 3, any suitable number may be used.

Each of the wireless process communication protocol module 220 and wireless communication protocol module 222 is coupled to controller 230 which is also coupled to the wired process communication module 238. Controller 230 is preferably a microprocessor that executes a sequence of instructions to perform a number of handheld field maintenance tasks. Wired process communication module 238 allows handheld field maintenance tool 200 to be physically coupled via a wired connection, at terminals 242, 244 to a field device, for example. Examples of suitable wired process communication include the HART protocol, the FOUNDATION™ Fieldbus protocol, and others. Handheld field maintenance tool 200 may also include a memory component 250 configured to store one or more applications 252 as well as a data store 254.

Memory 250, may contain instructions, that, when actuated, cause tool 200 to run one or more of applications 252. For example, an operator may wish to test a field device commissioned within a process installation. The operator may indicate, for example through an input/output mechanism 264, which may be part of a user interface 260 of handheld field maintenance tool 200, that he or she wishes to run one of the applications 252. In response to the received indication, handheld field maintenance tool 200 may run the stored instructions, causing the process control loop to simulate a signal from one or more transmitters that should cause the device, in response to the received simulated signal, to respond. In one embodiment, handheld field maintenance tool 200 may be configured to store the results of the commissioning test, for example within data store 254. However, in another embodiment, handheld field maintenance tool 200 may be configured to send a report of the results of the commissioning test to a remote system, for example a remote asset management system, a remote control system, or other remote source.

A user may indicate which device, and/or which process variable, to simulate using an appropriate button 264 or via navigation of a handheld field maintenance device menu presented on a display 262 of tool 200. Once the device simulation function has been selected, controller 230 may cause display 262 to provide one or more user interface elements 264 that help the user select a particular field device. For example, user interface 260 may include a dropdown box that lists all known field device manufacturers. Then, once a user selects a device manufacturer, a second user interface element may provide the selection of a device type. Once the device type has been selected, a third user interface element may provide a comprehensive listing of all known field devices manufactured by the selected manufacturer of the selected type. In another embodiment, controller 230 may retrieve and present indications of all, or a subset of all, installed field devices within a process, such that the operator may select which device to simulate. In another embodiment, controller 230 presents a set of field devices within a process, and the operator selects which device they wish to confirm functionality for, for example valve 140, and controller 230, or a remote control system to which controller 230 is communicatively coupled, selects which field device to simulate.

Handheld field maintenance tool may be configured to, using wireless communication protocol module 222, communicate with a remote system, for example a remote asset management system or a distributed control system, to cause a simulated signal of one or more selected field devices, to be sent over a process control loop. In the example described above with respect to FIG. 2, this may comprise handheld field maintenance tool 120 communicating, either through remote asset management system 110, or directly with distributed control system 160, a command to simulate a response from one or more of the transmitters 142, 144, 146 to generate a signal that should be sufficient to cause valve 140 to actuate.

Figure 4:
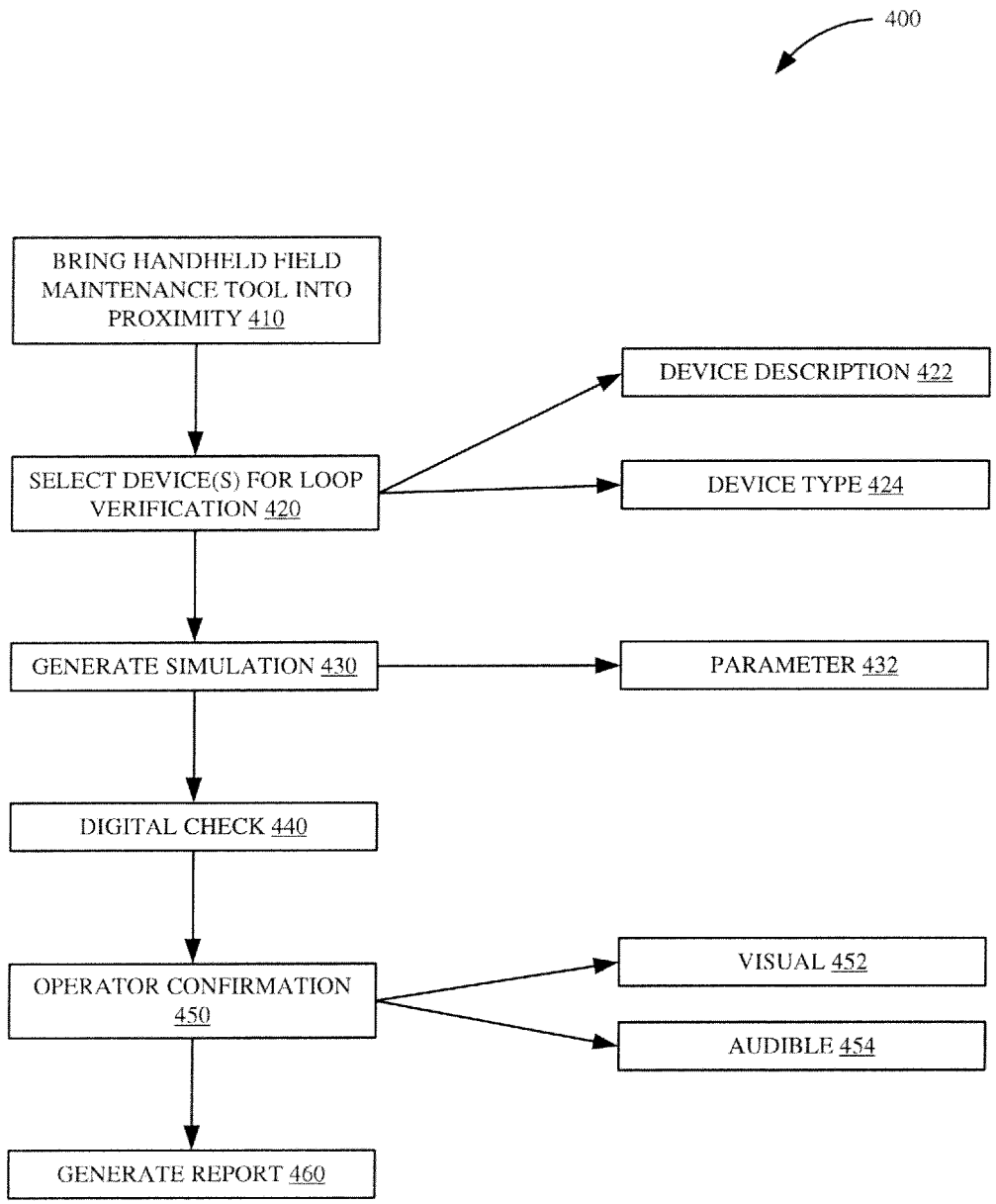
FIG. 4 is a flow diagram of a method of confirming a commissioning of a field device in accordance with an embodiment of the present invention.

FIG. 4 is a flow diagram of a method of confirming a commissioning of a field device in accordance with one embodiment of the present invention. Method 400 may be used to test whether a field device has been correctly commissioned within a process control loop. Method 400 may, in one embodiment, require an operator to be within a visual range of the field device. In another embodiment, method 400 may require an operator to be within an audible range of a field device.

In block 410, a handheld field maintenance tool is brought into proximity of a field device, for example a newly commissioned, or recently repaired, field device. In one embodiment, proximity is a visual range of the field device, such that an operator of the handheld field maintenance tool can visually confirm whether or not the field device responds appropriately to simulated control signal—for example, seeing a valve open or close. In another embodiment, proximity comprises an audible range, such that the operator can hear an indication of whether the field device responds appropriately—for example, hearing a pump turn on or off.

In block 420, a field device is selected for process control loop verification. In one embodiment, the operator selects the field device they wish to test, for example using a drop down menu or other selection mechanism illustrated on a user interface of the handheld field maintenance tool. For example, the user interface may include a dropdown box that lists all known field device manufacturers. Then, once a user selects a device manufacturer, a second user interface element may provide the selection of a device type, as indicated in block 424. Once the device type has been selected, a third user interface element may provide a comprehensive listing of all known field devices manufactured by the selected manufacturer of the selected type.

Once the user selects a specific field device(s), a device description (DD) may be accessed for the selected field device(s), as indicated at block 422. Additionally, if the user indicates that the field device is not provided in the list of field devices presented to the user from the selected manufacturer of the selected type, the handheld field maintenance tool may access an online database of field devices available from the selected manufacturer of the selected type, for example using wireless communication protocol module 222. Accessing the requisite device description(s) may be accomplished via an internal lookup of a database of device descriptions stored locally within a handheld field maintenance tool. If the required device description(s) is not stored within a local device description database, or if no database is provided, handheld field maintenance tool may access the requisite device description(s) via wireless communication protocol module 222 over the Internet, or any suitable network. Once the device description(s) has been acquired, handheld field maintenance tool will possess a comprehensive description of the capabilities and behaviors of the selected field device for which simulation is desired.

In one embodiment, selecting a field device comprises the handheld field maintenance tool providing a confirmation of the selected field device, and that the operator is within the required proximity of the selected field device. For example, handheld field maintenance tool may, on a display component, provide an image of the selected field device. The handheld field maintenance tool may also provide identification information for the selected device that can be locally confirmed, for example a device identification number or a serial number.

In block 430 the handheld field maintenance tool causes a simulation to be generated. In one embodiment, the operator may also need to indicate how they would like to test the field device, for example the operator may indicate which transmitter should simulate a control signal in order to test a newly-commissioned valve, for example. However, in another embodiment, upon selection of a device in block 420, the handheld field maintenance tool, or a remote system, or a distributed control system will determine which control signal will be sent in order to test the commissioning of the selected field device.

In one embodiment, the handheld field maintenance tool presents a user interface to the operator that allows the configuration of specific parameters of the simulated field device. An example may be allowing the technician to specify a process variable, such as a process fluid pressure, or temperature, that is provided by the simulated field device. In one embodiment, handheld field maintenance tool interacts with a process controller via a process communication module. Examples of such interaction include communication over a wired process control loop or segment using a wired process communication module.

As set forth above with respect to FIG. 2, a field device may be configured to actuate or change state upon receiving a control signal, in one embodiment. For example, in an overflow situation, a valve may be configured to open to allow for a removal of excess fluid from a process. The command to open may comprise a process control signal, for example, from a transmitter within the process installation or a process controller. Therefore, in block 430, generating a simulation may comprise generating a simulated process control signal from one or more transmitters that should, under normal working scenarios, cause the valve to move.

In block 440, a digital check is completed. The digital check may comprise confirmation by a remote system, such as a distributed control system or an asset management system, that the field device responded as required, and that the response was recorded by the remote system. A digital confirmation may be part of the commissioning process. In one embodiment, a result of the digital check, for example a pass/fail indication, may be stored. The result may be stored by the handheld field maintenance tool, the field system, or another suitable memory component.

In block 450, an operator confirmation is conducted. An operator confirmation may comprise a visual inspection (watching the valve physically open or close) or an audible confirmation (hearing a pump turn on or off), as indicated in blocks 452 and 454, respectively. In one embodiment, the operator confirmation is conducted in parallel to the digital check described with respect to block 440. In one embodiment, conducting an operator confirmation check comprises providing, on a user interface of the handheld field maintenance tool, a dialog box allowing an operator to confirm that the field device operated as expected. The operator may also be able to access information on what the expected visual or audible confirmation should be, for example an image/video or audio file. In one embodiment, the option for accessing a stored video, image, or audio file is available prior to generation of the simulated process control signal, such that the operator can familiarize themselves with what indication to watch or listen for. In one embodiment, conducting an operator confirmation, as indicated in block 450, comprises the handheld field maintenance tool automatically, through a display or speaker, providing an indication of the visual or audible confirmation expected.

In block 460, a report is generated. If the selected field device responded as expected, the report generated in block 460 may indicate a "pass" status. If the selected field device passes only one of the digital and operator checks, but not the other, the report may so indicate. The report may be generated automatically whenever a simulated process control signal is generated. The generated report may be stored, for example in a remote asset management system, in one embodiment. In another embodiment, the generated report is stored in a memory component of the handheld field maintenance tool.

In one embodiment, generating a report in block 460 comprises generating a complete audit trail. An audit trail may be required to satisfy some safety and/or commissioning standards. Such an auto-documentation feature may be completed every time a field device is tested, regardless of whether the test indicated success or failure of the field device commissioning. In one embodiment, the steps indicated in blocks 430, 440, 450 proceed automatically when a field device configuration test is initiated. For example, in one embodiment, once a field device is selected in block 420, a simulation is automatically generated, and a digital check automatically completed. The operator of the handheld field maintenance tool may be prompted to enter an indication of whether they saw an expected visual indication, or heard an expected audible indication that the field device passed. The operator indication may be automatically incorporated into, and stored as part of the generated report.

While method 400 has been discussed in the context of transmitters causing a valve to open or close, it is expressly contemplated that the method applies to any field device that, upon actuation, undergoes a visually or audibly detectable change of state.

Figure 5:
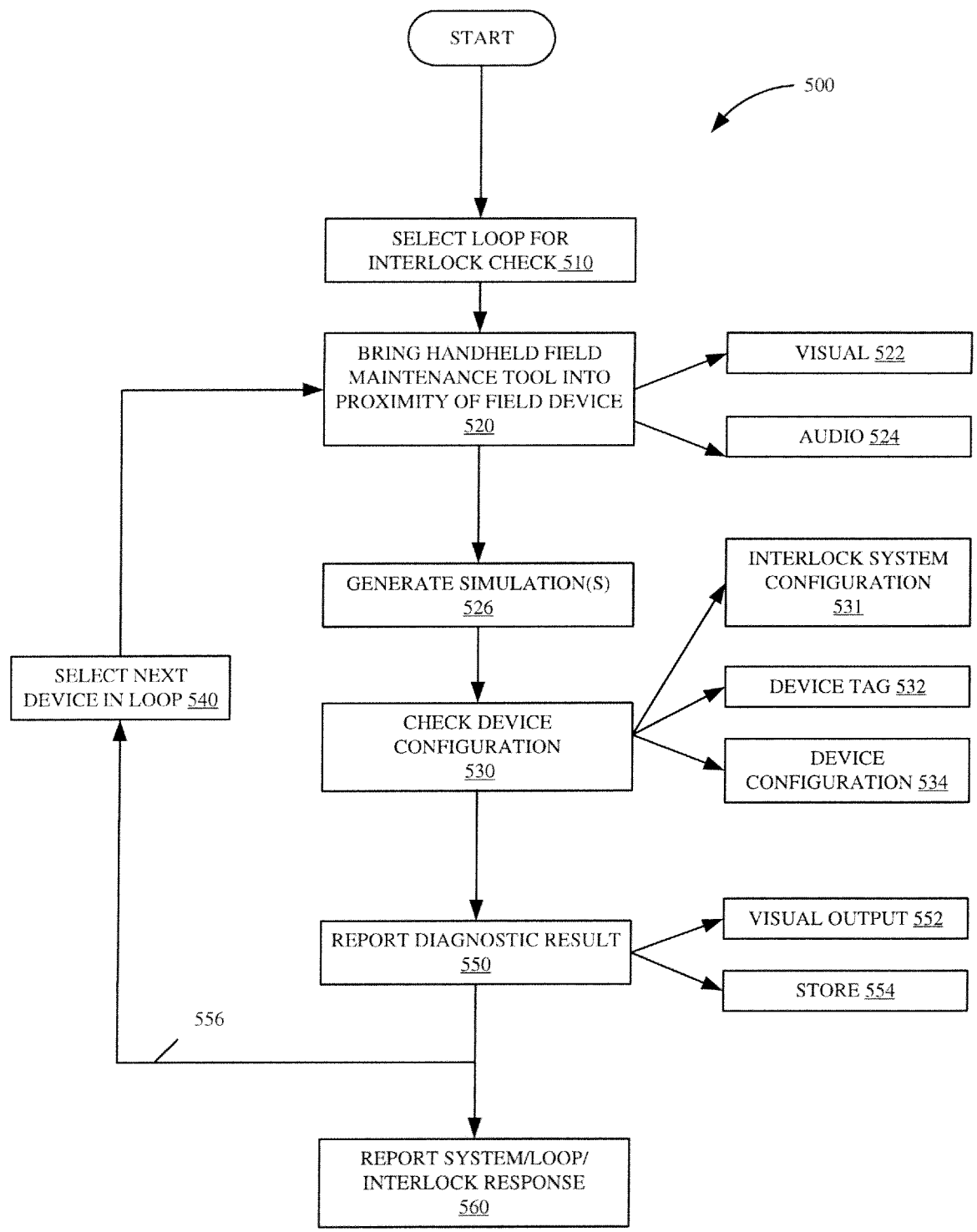
FIG. 5 is a flow diagram of a method of conducting a process loop interlock check in accordance with an embodiment of the present invention.

FIG. 5 is a flow diagram of a method of conducting a process control loop interlock check in accordance with one embodiment of the present invention. Method 500 may be used to verify that an entire process control loop, or a segment of a process control loop, is working properly. This may be useful, for example, after a new device within the process control loop is commissioned, or after repairs are completed and a repaired device is brought back online.

In block 510, one or more process control loops is/are selected for an interlock check. In one embodiment, the loop is selected on a user interface of a handheld field maintenance tool by an operator. The selection may occur in the field, for example an operator may select a device for testing, and may then wish to verify other parts of the process control loop. For example, if a selected field device fails the test in method 400, it may be desirous to test, while still in the field, another portion of the process control loop to determine whether the field device is commissioned properly or, alternatively, to determine what is else may be causing the error.

In block 520, the handheld field maintenance tool is brought into proximity of a field device on the process control. In one embodiment, this may be done with the assistance of a positioning system (e.g. a GPS or RFID module) within the handheld field maintenance tool, as the field devices within a given process loop may be dispersed throughout a process installation. Bringing the handheld field maintenance tool into proximity of the field device may comprise bringing the handheld field maintenance tool within a visual range 522 or an audible range 524, based on the actuation specific to the field device being tested.

In one embodiment, bringing the handheld field maintenance tool into proximity of a field device comprises the handheld field maintenance tool presenting, on a display component, a prompt indicating that the operator may be in an audible/visual range, and requesting confirmation. The prompt may include an indication of what the field device looks like, or where the device is located, as many field devices may not be located at eye level.

At block 526, the handheld field maintenance tool is used to generate one or more simulated field device signals on the process control loop. Generally, such simulated values are intended to cause a control element to take some particular action or generate a command signal that causes a field device or process control element to change state, move, or otherwise actuate.

In block 530 a device configuration is checked. Checking a device configuration, may comprise confirming a proper interlock system configurations, as indicated at block 531; confirming a device tag, as indicated in block 532; and checking that the device is physically configured properly, as indicated in block 534. Checking a device configuration, as indicated in block 530, may also comprise conducting a device commissioning test, for example the test described in method 400, or any other suitable confirmation test.

In block 550, a report is generated of the device configuration test. In one embodiment, the diagnostic is reported as a visual output 552 on a user interface of the handheld field maintenance tool. In another embodiment, the diagnostic report is stored, as indicated in block 554, within a memory component of the handheld field maintenance tool. In another embodiment, storing the diagnostic report comprises storing the diagnostic report at a remote site, for example within an asset management system.

If the loop interlock check was successful control passes to block 560, where the system/loop/interlock report is provided to a system controller, technician, or other suitable entity. If, however, the interlock check was not successful or if there are additional devices to test, control returns to block 540 along line 556 where the next device in the process control loop is selected. The handheld field maintenance tool may then prompt the operator to return, as indicated by the arrow returning to block 520, to bring the handheld field maintenance tool within proximity of the next field device within the loop. In a process control loop with redundant checks, even if a successful diagnostic check is reported, the method may still proceed through block 540 to return to block 520 such that the next field device within the process loop is tested.

Although the present invention has been described with reference to preferred embodiments, workers skilled in the art will recognize that changes may be made in form and detail without departing from the spirit and scope of the invention.

What is claimed is:

1. A method of testing a configuration of a valve, the method comprising:
   selecting the valve using a user interface of a handheld field maintenance tool;
   accessing a device description (DD) of the selected valve;
   moving the handheld field maintenance tool into a proximity of the selected valve;
   using the user interface of the handheld field maintenance tool to simulate a process variable, wherein the simulated process variable is configured to cause the selected valve to undergo an operator perceived response;
   performing a digital check, with a remote system, to confirm that the selected valve is communicably coupled to a process control loop;
   receiving an indication, through the user interface of the handheld field maintenance tool, of a response of the selected valve to the simulated process variable; and
   wherein simulating the process variable and performing the digital check occur automatically once the handheld field maintenance tool is within the proximity of the selected valve.

2. The method of claim 1, wherein the proximity comprises the handheld field maintenance tool positioned such that an operator is within a visual range of the selected valve.

3. The method of claim 1, wherein the proximity comprises the handheld field maintenance tool positioned such that an operator is within an audible range of the selected valve.

4. The method of claim 1, wherein generating the simulated process variable comprises a controller of the handheld field maintenance tool causing a distributed control system to generate the simulated process variable on the process control loop.

5. The method of claim 1, and further comprising:
   generating a report comprising a result of the digital check and the indication of the response of the selected valve to the simulated process variable.

6. The method of claim 5, wherein the generated report is stored in a remote asset management system.

7. The method of claim 5, wherein the report comprises an audit trail.

8. A handheld field maintenance tool comprising:
   a wireless communication protocol module;
   a database component configured to access a device description (DD) of a selected valve;
   a controller configured to select a valve, and wherein the controller is configured to, when the handheld field maintenance tool is within a defined proximity of the field device, cause at least one field device to simulate a process control signal to the selected valve, wherein the simulated process control signal is configured to cause the selected valve to change state, and wherein the simulated process control signal is sent over the wireless communication protocol module;

a user interface configured to receive an indication from an operator of the handheld field maintenance tool, wherein the indication comprises a result of the simulated process control signal on the selected valve;

a remote system configured to perform a digital check to confirm that the selected valve is communicably coupled to a process control loop;

a memory component configured to store the received indication from the operator; and wherein simulating the process control signal and performing the digital check occur automatically once the handheld field maintenance tool is within the defined proximity of the selected valve.

9. The handheld field maintenance tool of claim 8, wherein simulating the process control signal to the selected valve comprises communicating, with the wireless communication protocol module, to a distributed control system, which generates the simulated process control signal.

10. The handheld field maintenance tool of claim 8, and further comprising:

a positioning system configured to provide an indication of a location of the handheld field maintenance tool within a process installation with respect to a field device.

11. The handheld field maintenance tool of claim 10, wherein the positioning system comprises a Global Positioning System (GPS) module.

12. The handheld field maintenance tool of claim 8, wherein the wireless communication protocol module is coupled to the controller and is configured to receive a digital confirmation, from a remote source, indicating whether the simulated process control signal is received by the selected valve.

13. The handheld field maintenance tool of claim 12, wherein the controller generates an audit trail comprising both the digital confirmation and the received indication from the operator.

14. The handheld field maintenance tool of claim 13, wherein the generated audit trail is stored within a remote asset management system.

15. A method of testing a configuration of a process actuator in a process environment, the method comprising:

selecting the process actuator using a user interface of a handheld field maintenance tool;

accessing a device description (DD) of the selected process actuator;

moving the handheld field maintenance tool into a proximity of the selected process actuator;

using the user interface of the handheld field maintenance tool to cause at least one field device to simulate a process control signal to the selected process actuator, wherein the simulated process control signal is configured to cause the selected process actuator to undergo an operator perceived response;

performing a digital check, with a remote system, to confirm that the selected process actuator is communicably coupled to a process control loop;

receiving an indication, through the user interface of the handheld field maintenance tool, of a response of the selected process actuator to the simulated process control signal; and wherein simulating the process control signal and performing the digital check occur automatically once the handheld field maintenance tool is within the proximity of the selected process actuator.

16. The method of claim 15, wherein the selected process actuator is a valve.

17. The method of claim 15, wherein the at least one field device is disposed upstream from the selected process actuator.

18. The method of claim 15, wherein the at least one field device is disposed downstream from the selected process actuator.

* * * * *